(12) United States Patent
Wu et al.

(10) Patent No.: US 11,166,242 B2
(45) Date of Patent: Nov. 2, 2021

(54) CONFIGURING A POWER OFFSET SET REPRESENTING A DIFFERENCE BETWEEN POWER USED TO TRANSMIT FIRST AND SECOND REFERENCE SIGNALS

(71) Applicants: China Mobile Communication Co., Ltd Research Institute, Beijing (CN); China Mobile Communications Group Co., Ltd., Beijing (CN)

(72) Inventors: Dan Wu, Beijing (CN); Hui Tong, Beijing (CN); Fei Wang, Beijing (CN); Yi Zheng, Beijing (CN)

(73) Assignees: China Mobile Communication Co., Ltd Research Inst., Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 16/639,249

(22) PCT Filed: Jun. 13, 2018

(86) PCT No.: PCT/CN2018/091030
§ 371 (c)(1),
(2) Date: Feb. 14, 2020

(87) PCT Pub. No.: WO2019/033842
PCT Pub. Date: Feb. 21, 2019

(65) Prior Publication Data
US 2020/0245263 A1    Jul. 30, 2020

(30) Foreign Application Priority Data
Aug. 18, 2017   (CN) .......................... 201710712309.7

(51) Int. Cl.
*H04W 52/32*  (2009.01)
*H04W 52/18*  (2009.01)
(Continued)

(52) U.S. Cl.
CPC ....... *H04W 52/325* (2013.01); *H04W 52/245* (2013.01)

(58) Field of Classification Search
CPC . H04W 52/16; H04W 52/245; H04W 52/325; H04W 52/36; H04W 52/146;
(Continued)

(56) References Cited

U.S. PATENT DOCUMENTS

2010/0254471 A1   10/2010   Ko et al.
2013/0078913 A1*   3/2013   Lee .................. H04L 5/0053
                                                       455/39

(Continued)

FOREIGN PATENT DOCUMENTS

CN    102958147 A      3/2013
CN    103369654       10/2013
(Continued)

OTHER PUBLICATIONS

Chinese Office Action (First) dated Dec. 3, 2020, for Chinese Patent Application No. 201710712309.7, 6 pages.
(Continued)

*Primary Examiner* — Philip Sobutka
(74) *Attorney, Agent, or Firm* — Morgan, Lewis & Bockius LLP

(57) ABSTRACT

A method of indicating transmit power of a reference signal (RS), a method of receiving transmit power of an RS, a network device, and user equipment are provided. The method includes: configuring a power offset set including a plurality of power offset values, where a power offset value in the power offset set represents a difference between power used to transmit a first RS and power used to transmit a second RS; and transmitting indication information to user equipment, where the indication information carries an actual difference value between the power used to transmit the first RS and the power used to transmit the second RS, and the actual difference value between the power is a power offset value in the power offset set.

15 Claims, 4 Drawing Sheets

(51) Int. Cl.
*H04B 7/06* (2006.01)
*H04W 52/24* (2009.01)

(58) Field of Classification Search
CPC ........ H04W 52/38; H04W 52/18; H04L 5/00;
H04B 7/06; H04B 7/024
See application file for complete search history.

(56) References Cited

U.S. PATENT DOCUMENTS

| | | |
|---|---|---|
| 2013/0343300 A1 | 12/2013 | Kim et al. |
| 2014/0162717 A1 | 6/2014 | Liu |
| 2015/0244444 A1 | 8/2015 | Mazzarese et al. |
| 2018/0212726 A1 | 7/2018 | Xue et al. |

FOREIGN PATENT DOCUMENTS

| | | |
|---|---|---|
| CN | 103945504 | 7/2014 |
| CN | 104662945 A | 5/2015 |
| WO | WO 2017/014600 A1 | 1/2017 |

OTHER PUBLICATIONS

English Translation of Chinese Office Action (First) dated Dec. 3, 2020, for Chinese Patent Application No. 201710712309.7, 6 pages.
Chinese Written Opinion of the International Searching Authority dated Aug. 21, 2018, for PCT/CN2018/091030, 10 pages.
International Preliminary Report on Patentability with Written Opinion (in English) dated Aug. 21, 2018, for PCT/CN2018/091030, 7 pages.

\* cited by examiner

Multi-panel joint

Partial-panel joint

CONFIGURING A POWER OFFSET SET REPRESENTING A DIFFERENCE BETWEEN POWER USED TO TRANSMIT FIRST AND SECOND REFERENCE SIGNALS

CROSS-REFERENCE TO RELATED APPLICATION

This application is a U.S. national phase application of a PCT Application No. PCT/CN2018/091030 filed on Jun. 13, 2018, which claims priority to a Chinese Patent Application No. 201710712309.7 filed in China on Aug. 18, 2017, the disclosure of which is incorporated herein by reference in its entirety.

TECHNICAL FIELD

The present disclosure relates to the field of communication technology, in particular to a method of indicating transmit power of a reference signal (RS), a method of receiving transmit power of an RS, a network device, and user equipment (UE).

BACKGROUND

There are a plurality of antenna panels in both a fifth-generation (5G) high frequency band base station end antenna model and a UE antenna model. It may be considered that antenna array elements within each of the plurality of panels are calibrated, while antenna array elements may not be completely calibrated between panels. How to perform beamforming with a plurality of panels during multi-beam operations is an important subject in a 5G system.

If antenna array elements are adequately calibrated between panels, antenna array elements of a plurality of panels may be considered as forming one larger antenna. In this way, joint beamforming may be performed with the plurality of panels. As shown in FIG. 1, by combing power of the plurality of panels, a formed beam has a relatively high beamforming gain, has a relatively narrow beam width, and is restricted to the beam direction in the entire bandwidth.

On the other hand, as shown in FIG. 2, independent beamforming may be performed with each panel. Because a quantity of antenna array elements on a single panel is less than a combined quantity of array elements on a plurality of panels, a resultant beamforming gain is lower than that of joint beamforming of the plurality of panels, a resultant beam width is relatively larger, but beamforming is more flexible within the entire bandwidth range.

In practice, in a 5G New Radio (NR) system, apart from the fully joint and fully-independent multi-panel beamforming operations, a physical downlink shared channel (PDSCH) should support flexible multi-panel transmission in order to implement more flexible single-user (SU) and multi-user (MU) transmission. According to a channel condition and SU or MU scheduling, a base station may determine a panel transmission method used by a PDSCH in each subframe or slot, that is, a dynamic, flexible multi-panel/partial-panel joint/independent beamforming, as shown in FIG. 3. Herein, only a PDSCH is used as an example. The flexible multi-panel/partial-panel joint/independent beamforming may also be dynamically used in other physical layer channels.

By transmitting with different quantities of panels, actual transmit power of an RS may change. However, in the related art, a base station does not dynamically indicate actual transmit power of an RS, and user equipment (UE) has no idea about an antenna panel used by the base station to transmit an RS and an actual power change and as a result cannot accurately determine power used by the base station to transmit an RS.

SUMMARY

The present disclosure provides a method of indicating transmit power of an RS, a method of receiving transmit power of an RS, a network device, and user equipment, so that user equipment can accurately determine power used by a base station to transmit an RS, thereby avoiding a problem that the user equipment does not know about an antenna panel used by the base station to transmit an RS and as a result cannot accurately determine the power used by the base station to transmit an RS.

To solve the foregoing technical problems, the present disclosure provides in some embodiments the following solution: a method of indicating transmit power of an RS, which includes: configuring a power offset set including a plurality of power offset values, where a power offset value in the power offset set represents a difference between power used to transmit a first RS and power used to transmit a second RS; and transmitting indication information to user equipment, where the indication information carries an actual difference value between the power used to transmit the first RS and the power used to transmit the second RS, and the actual difference value between the power is a power offset value in the power offset set.

The first RS is a periodically transmitted RS, and the second RS is an aperiodically transmitted RS; or, the first RS is a semi-statically transmitted RS, and the second RS is an aperiodically transmitted RS; or, the first RS is a periodically transmitted RS, and the second RS is a semi-statically transmitted RS.

The difference between the power used to transmit the first RS and the power used to transmit the second RS is: a difference value between a first ratio of first power used to transmit the first RS to a preset reference value and a second ratio of second power used to transmit the second RS to the preset reference value.

The present disclosure further provides in some embodiments a network device, including: a processor, configured to configure a power offset set including a plurality of power offset values, where a power offset value in the power offset set represents a difference between power used to transmit a first RS and power used to transmit a second RS; and a transceiver, configured to transmit indication information to user equipment, where the indication information carries an actual difference value between the power used to transmit the first RS and the power used to transmit the second RS, and the actual difference value between the power is a power offset value in the power offset set.

The first RS is a periodically transmitted RS, and the second RS is an aperiodically transmitted RS; or, the first RS is a semi-statically transmitted RS, and the second RS is an aperiodically transmitted RS; or, the first RS is a periodically transmitted RS, and the second RS is a semi-statically transmitted RS.

The difference between the power used to transmit the first RS and the power used to transmit the second RS is a difference value between a first ratio of first power used to transmit the first RS to a preset reference value and a second ratio of second power used to transmit the second RS to the preset reference value.

The present disclosure further provides in some embodiments a method of receiving transmit power of an RS, including: receiving indication information transmitted by a network device, where the indication information carries an actual difference value between power used to transmit a first RS and power used to transmit a second RS, and the actual difference value between the power is a power offset value that is in a power offset set configured by the network device and represents a difference between the power used to transmit the first RS and the power used to transmit the second RS.

The first RS is a periodically transmitted RS, and the second RS is an aperiodically transmitted RS; or, the first RS is a semi-statically transmitted RS, and the second RS is an aperiodically transmitted RS; or, the first RS is a periodically transmitted RS, and the second RS is a semi-statically transmitted RS.

The method of receiving transmit power of an RS further includes: determining, according to the power offset value in the indication information, transmit power used by the network device to transmit a current RS.

The present disclosure further provides in some embodiments user equipment, including: a transceiver, configured to receive indication information transmitted by a network device, where the indication information carries an actual difference value between power used to transmit a first RS and power used to transmit a second RS, and the actual difference value between the power is a power offset value that is in a power offset set configured by the network device and represents a difference between the power used to transmit the first RS and the power used to transmit the second RS.

The first RS is a periodically transmitted RS, and the second RS is an aperiodically transmitted RS; or, the first RS is a semi-statically transmitted RS, and the second RS is an aperiodically transmitted RS; or, the first RS is a periodically transmitted RS, and the second RS is a semi-statically transmitted RS.

The user equipment further includes a processor, configured to determine, according to the power offset value in the indication information, transmit power used by the network device to transmit a current RS.

The present disclosure further provides in some embodiments a communication device, including a processor and a storage storing therein a computer program, where the computer program is configured to be executed by the processor to implement the foregoing method.

The present disclosure further provides in some embodiments a computer-readable storage medium including instructions, where the instructions are configured to be executed by a computer to enable the computer to implement the foregoing method.

The foregoing solutions of the present disclosure at least have the following beneficial effects: according to the foregoing solutions of the present disclosure, signaling is used to indicate transmit power used to transmit an RS, so that UE can accurately determine power used by a base station to transmit an RS, thereby avoiding a problem that the UE does not know about an antenna panel used by the base station to transmit an RS and as a result cannot accurately determine the power used by the base station to transmit an RS.

DETAILED DESCRIPTION

Exemplary embodiments of the present disclosure are described below further in detail with reference to the accompanying drawings. Although the exemplary embodiments of the present disclosure are shown in the accompanying drawings, it should be understood that the present disclosure may be implemented in various forms and is by no means limited to embodiments described herein. On the contrary, these embodiments are provided for more thorough understanding of the present disclosure and to completely convey the scope of the present disclosure to a person skilled in the art.

Figure 1:
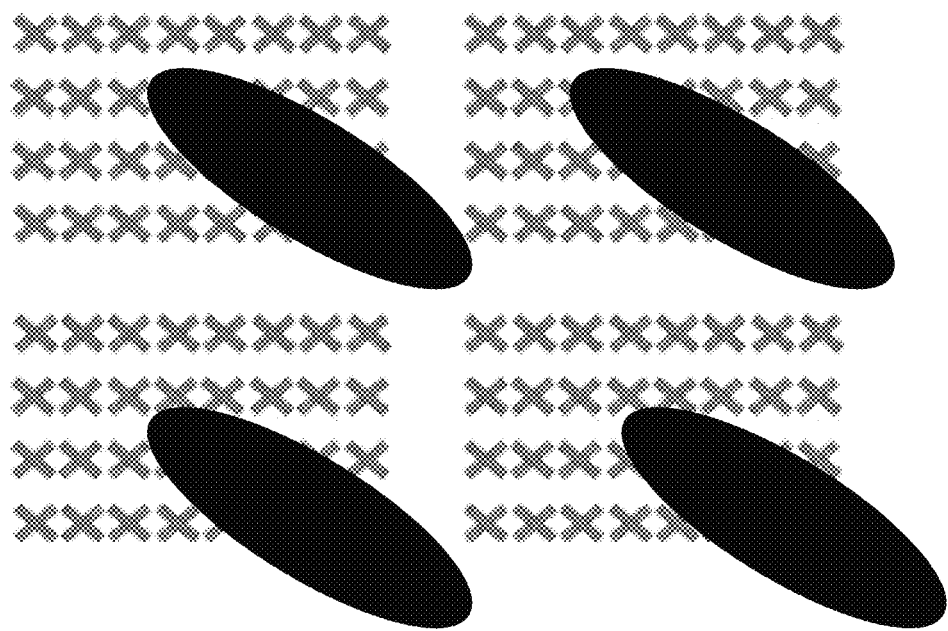
FIG. 1 is a schematic diagram of multi-panel joint beamforming.
Figure 2:
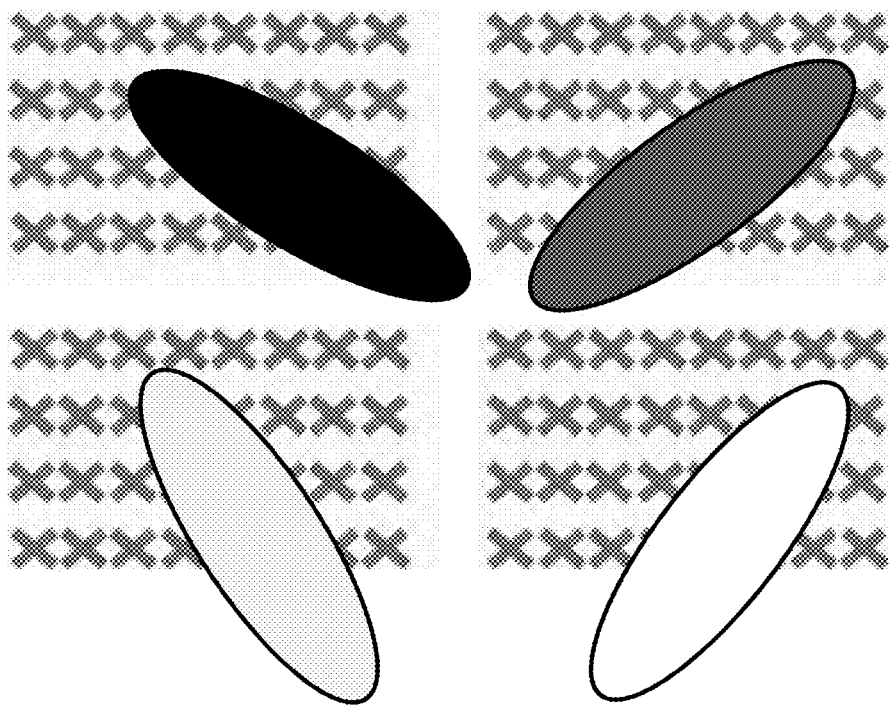
FIG. 2 is a schematic diagram of multi-panel independent beamforming.
Figure 3:
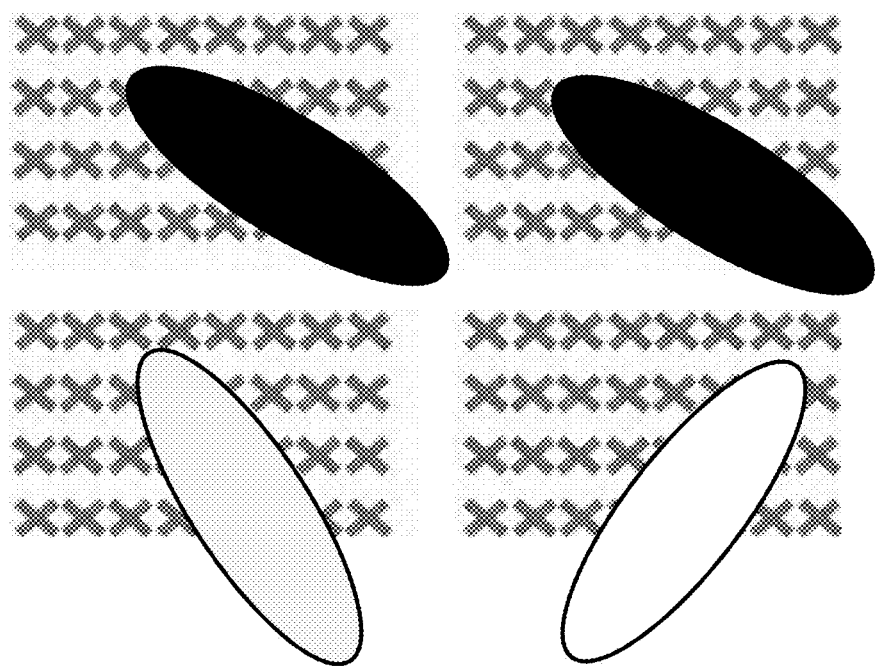
FIG. 3 is a schematic diagram of partial-panel joint beamforming.
Figure 4:
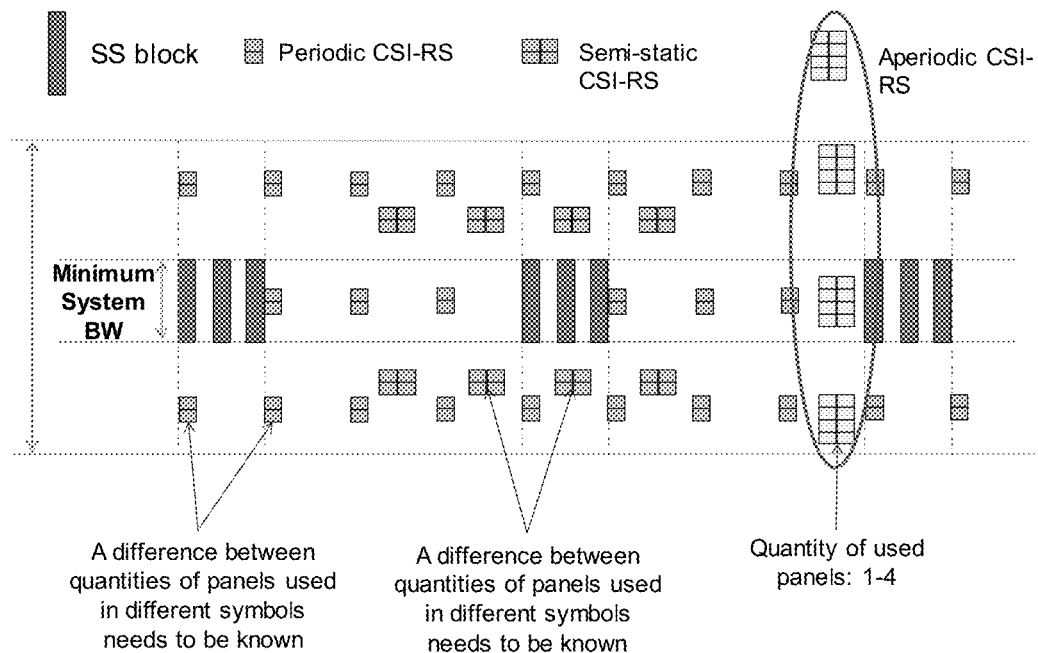
FIG. 4 is a schematic diagram of a channel state information (CSI)-RS being transmitted periodically, semi-statically, and aperiodically in a 5G system.

The impact of flexible multi-panel/partial-panel beamforming on design: it is possible that different quantities of panels may be used for RSs in different symbols. In NR (5G), a CSI-RS may be transmitted periodically, semi-statically, or aperiodically, as shown in FIG. 4.

For periodic and semi-static CSI-RSs, if there is a synchronization signal (SS) block in a configured transmission symbol, a quantity of panels and power corresponding to the transmission symbol are different from a quantity of panels and power in a symbol without an SS block.

For an aperiodic CSI-RS, actual transmit power of the CSI-RS may change with different quantities of panels used in the transmission.

In NR, a CSI-RS may be used for estimating a path loss. Therefore, to estimate a path loss, user equipment needs to know precise transmit power of a CSI-RS.

In the embodiments of the present disclosure, in view of the characteristics of flexible multi-panel and partial-panel beamforming of an NR multi-panel antenna model, an indication of transmit power of an aperiodic CSI-RS is designed, thereby ensuring flexible configuration and use of a multi-panel/partial-panel transmission mode.

Figure 5:
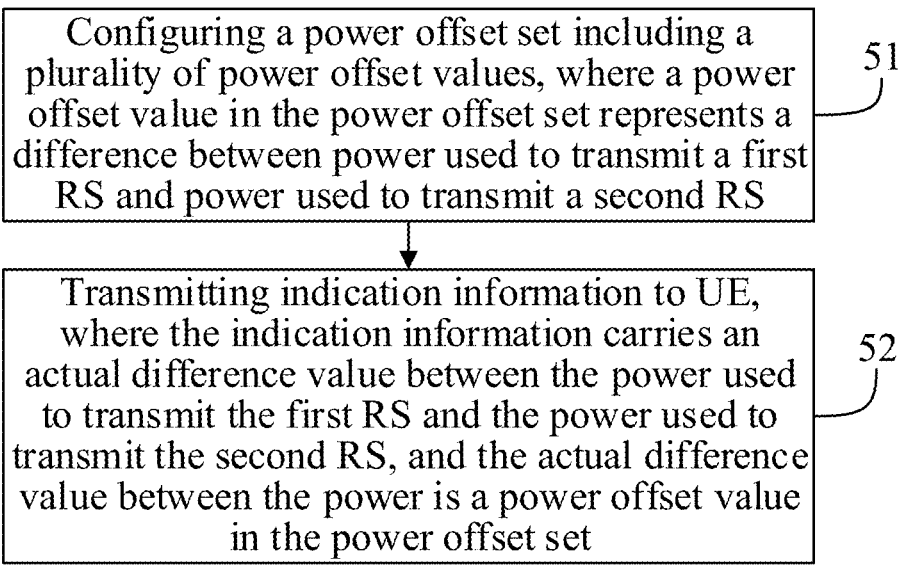
FIG. 5 is a flowchart of a method of indicating transmit power of an RS according to the present disclosure.

As shown in FIG. 5, a method of indicating transmit power of an RS according to an embodiment of the present disclosure includes the following steps.

A step 51 includes: configuring a power offset set including a plurality of power offset values, where the power offset set represents a range of optional power offset values, and a power offset value in the power offset set represents a difference between power used to transmit a first RS and power used to transmit a second RS.

A step 52 includes: transmitting indication information to user equipment, where the indication information carries an actual difference value between the power used to transmit the first RS and the power used to transmit the second RS, and the actual difference value between the power is a power offset value in the power offset set.

In this embodiment, the first RS is a periodically transmitted RS, and the second RS is an aperiodically transmitted RS; or, the first RS is a semi-statically transmitted RS, and the second RS is an aperiodically transmitted RS; or, the first RS is a periodically transmitted RS, and the second RS is a semi-statically transmitted RS. The periodically transmitted RS may be an RS transmitted using a plurality of panels or may be an RS transmitted using a single panel. The aperiodically transmitted RS may be an RS transmitted using a plurality of panels or may be an RS transmitted using a single panel.

In this embodiment of the present disclosure, signaling is used to indicate transmit power used to transmit an RS, so that UE can accurately determine power used by a base station to transmit an RS, thereby avoiding a problem that the UE does not know about an antenna panel used by the base station to transmit an RS and as a result cannot accurately determine the power used by the base station to transmit an RS.

In a specific embodiment of the present disclosure, the foregoing step 51 may specifically include: configuring the power offset set by using a high layer signaling. For example, the power offset set is configured by using a radio resource control (RRC) signaling.

The difference between the power used to transmit the first RS and the power used to transmit the second RS is a difference value between a first ratio of first power used to transmit the first RS to a preset reference value and a second ratio of second power used to transmit the second RS to the preset reference value. However, the difference is not limited thereto, and may be a difference value between the first power and the second power.

In a specific embodiment of the present disclosure, the foregoing step 52 may specifically include: transmitting the indication information to the user equipment by using a physical layer signaling and/or medium access control (MAC) signaling. For example, the physical layer signaling includes a Layer 1 (L1) signaling, and may be specifically downlink control information (DCI) signaling. The MAC signaling may be a Layer 2 (L2) signaling, and may be specifically MAC control element (CE) signaling.

Further, the step of transmitting the indication information to the user equipment by using the physical layer signaling and/or MAC signaling includes: transmitting the indication information to the user equipment by using at least one bit in the physical layer signaling and/or MAC signaling.

In a specific embodiment of the present disclosure, a CSI-RS is used as an example of the RS for description. Similar indication information may be used for other periodic, semi-static, aperiodic RSs.

For example, in an Embodiment 1, in high layer configuration information of a CSI-RS, in addition to a Pc (reference power indication, which may be a ratio of power of a periodic CSI-RS to a preset reference value, or may be actual transmit power of a periodic CSI-RS, that is, the preset reference value is 1), one power ratio indication: ApSymPowerOffset (power offset value) needs to be added. In addition, a difference value between power of an aperiodically transmitted CSI-RS and Pc is configured as being selected from {0 dB, 3 dB, 4.77 dB, 6 dB, 6.99 dB, 7.78 dB, 8.45 dB, 9 dB}. The power offset set includes eight power offset values. In this case, one field may be added to DCI. The field indicates actual power of an aperiodically transmitted CSI-RS by using three bits.

For another example, in an Embodiment 2, in high layer configuration information of a CSI-RS, in addition to Pc (reference power indication, which may be a ratio of power of a periodic CSI-RS to a preset reference value, or may be actual transmit power of a periodic CSI-RS, that is, the preset reference value is 1), one power ratio indication: ApSymPowerOffset further needs to be added. A difference value between power of an aperiodically transmitted CSI-RS and Pc is indicated and is selected from {0 dB, −3 dB, −4.77 dB, −6 dB, −6.99 dB, −7.78 dB, −8.45 dB, −9 dB}. The power offset set includes eight power offset values. In this case, one field is added to DCI. The field indicates actual power of an aperiodically transmitted CSI-RS by using three bits.

For still another example, in an Embodiment 3, in high layer configuration information of a CSI-RS, in addition to Pc (reference power indication, which may be a ratio of power of a periodic CSI-RS to a preset reference value, or may be actual transmit power of a periodic CSI-RS, that is, the preset reference value is 1), one power ratio indication: ApSymPowerOffset further needs to be added. A ratio of power of an aperiodically transmitted CSI-RS to Pc is indicated and is selected from {−9 dB, −8.45 dB, −7.78 dB, −6.99 dB, −6 dB, −4.77 dB, −3 dB, 0 dB, 3 dB, 4.77 dB, 6 dB, 6.99 dB, 7.78 dB, 8.45 dB, 9 dB}. The power offset set includes 15 power offset values. One field is added to DCI. The field may indicate actual power of an aperiodically transmitted CSI-RS by using 4 bits.

In the foregoing embodiments of the present disclosure, in view of the characteristics of flexible multi-panel and partial-panel beamforming of an NR multi-panel antenna model, transmit power of an aperiodic CSI-RS is dynamically indicated by designing an RRC+MAC CE/DCI indication of a transmit power configuration of an aperiodic CSI-RS, thereby ensuring flexible configuration and use of a multi-panel/partial-panel transmission mode. The value of power offset value is not limited to the values listed in the foregoing embodiments.

Corresponding to the foregoing method, the present disclosure further provides in some embodiments a network device, including: a processor, configured to configure a power offset set including a plurality of power offset values, where the power offset set represents a range of optional power offset values, and a power offset value in the power offset set represents a difference between power used to transmit a first RS and power used to transmit a second RS; and a transceiver, configured to transmit indication information to user equipment, where the indication information carries an actual difference value between the power used to transmit the first RS and the power used to transmit the second RS, and the actual difference value between the power is a power offset value in the power offset set.

The first RS is a periodically transmitted RS, and the second RS is an aperiodically transmitted RS; or, the first RS is a semi-statically transmitted RS, and the second RS is an aperiodically transmitted RS; or, the first RS is a periodically transmitted RS, and the second RS is a semi-statically transmitted RS.

The processor configures the power offset set by using high layer signaling.

The difference between the power used to transmit the first RS and the power used to transmit the second RS is a difference value between a first ratio of first power used to transmit the first RS to a preset reference value and a second ratio of second power used to transmit the second RS to the preset reference value.

The transceiver transmits the indication information to the user equipment by using a physical layer signaling and/or MAC signaling.

The physical layer signaling includes a DCI signaling. The MAC signaling includes an MAC CE signaling.

The transceiver transmits the indication information to the user equipment by using at least one bit in the physical layer signaling and/or MAC signaling.

It should be noted that, in the network device, the processor and the transceiver may be connected by a bus or an interface. All implementations in the foregoing method embodiment shown in FIG. 5 are applicable to the embodiment of the network device, and the same technical effects can be achieved. The network device may be a base station, for example, a base station in a 5G system.

The present disclosure further provides in some embodiments a method of receiving transmit power of an RS, including: receiving indication information transmitted by a network device, where the indication information carries an actual difference value between power used to transmit a first RS and power used to transmit a second RS, and the actual difference value between the power is a power offset value that is in a power offset set configured by the network device and represents a difference between the power used to transmit the first RS and the power used to transmit the second RS.

The first RS is a periodically transmitted RS, and the second RS is an aperiodically transmitted RS; or, the first RS is a semi-statically transmitted RS, and the second RS is an aperiodically transmitted RS; or, the first RS is a periodically transmitted RS, and the second RS is a semi-statically transmitted RS.

The difference between power used to transmit an RS using a plurality of panels and power used to transmit an RS using a single panel is a difference value between a first ratio of first power used to transmit an RS using a plurality of panels to a preset reference value and a second ratio of second power used to transmit an RS using a single panel to the preset reference value. However, the difference is not limited thereto, and may be a difference value between the first power and the second power.

The method of receiving transmit power of an RS further includes: determining, according to the power offset value in the indication information, transmit power used by the network device to transmit a current RS.

The step of receiving indication information transmitted by a network device includes: receiving, by using a physical layer signaling and/or MAC layer signaling, the indication information transmitted by the network device.

The step of receiving, by using a physical layer signaling and/or MAC layer signaling, the indication information transmitted by the network device includes: obtaining, by receiving at least one bit in the physical layer signaling and/or MAC layer signaling, the indication information transmitted by the network device.

In the receiving method on user equipment side, by receiving an indication that is transmitted by a base station and indicates power used to transmit an RS, UE can accurately determine the power used by the base station to transmit an RS, thereby avoiding a problem that the UE does not know about an antenna panel used by the base station to transmit an RS and as a result cannot accurately determine the power used by the base station to transmit an RS.

Corresponding to the method on the user equipment side, the present disclosure further provides in some embodiments user equipment, including: a transceiver, configured to receive indication information transmitted by a network device, where the indication information carries an actual difference value between power used to transmit a first RS and power used to transmit a second RS, and the actual difference value between the power is a power offset value that is in a power offset set configured by the network device and represents a difference between the power used to transmit the first RS and the power used to transmit the second RS.

The first RS is a periodically transmitted RS, and the second RS is an aperiodically transmitted RS; or, the first RS is a semi-statically transmitted RS, and the second RS is an aperiodically transmitted RS; or, the first RS is a periodically transmitted RS, and the second RS is a semi-statically transmitted RS.

The user equipment further includes a processor, configured to determine, according to the power offset value in the indication information, transmit power used by the network device to transmit a current RS.

The transceiver receives, by using a physical layer signaling and/or MAC layer signaling, the indication information transmitted by the network device.

The transceiver obtains, by receiving at least one bit in the physical layer signaling and/or MAC layer signaling, the indication information transmitted by the network device.

It should be noted that, in the user equipment, the processor and the transceiver may be connected by a bus or an interface. All implementations in the foregoing method embodiment on the user equipment side are applicable to the embodiments of the user equipment, and the same technical effects can be achieved.

The present disclosure further provides in some embodiments a communication device, including a processor and a storage storing therein a computer program, where the computer program is configured to be executed by the processor to perform the foregoing method. The communication device may be the foregoing network device or may be the foregoing user equipment. When the communication device is the network device, the communication device implements the foregoing method of indicating transmit power of an RS as shown in FIG. 5. When the communication device is the user equipment, the communication device implements the foregoing method of receiving transmit power of an RS.

The present disclosure further provides in some embodiments a computer-readable storage medium including instructions, where the instructions are configured to be executed by a computer to enable the computer to implement the foregoing method.

In the foregoing embodiments of the present disclosure, high layer signaling is used to configure a power offset set of power offset values, where each power offset value represents a difference between power used to transmit an RS using a plurality of panels and power used to transmit an RS using a single panel, and a physical layer signaling is used to indicate a specific power offset value in the power offset set that corresponds to the transmission of a current RS, so that UE can accurately determine power used by a base station to transmit an RS, thereby avoiding a problem that the UE does not know about an antenna panel used by the base station to transmit an RS and as a result cannot accurately determine the power used by the base station to transmit an RS.

The foregoing descriptions are optional implementations of the present disclosure. It should be noted that several improvements and modifications may be made by a person of ordinary skill in the art without departing from the principle of the present disclosure. These improvements and modifications should be construed as falling within the scope of the present disclosure.

What is claimed is:

1. A method of indicating transmit power of a reference signal (RS), comprising:
configuring a power offset set comprising a plurality of power offset values, wherein a power offset value in the power offset set is a difference of power used to transmit a second RS from power used to transmit a first RS; and transmitting indication information to user equipment, wherein the indication information carries an actual difference value between the power used to transmit the first RS and the power used to transmit the second RS, and the actual difference value between the power is a power offset value in the power offset set.

2. The method of indicating the transmit power of the RS according to claim 1, wherein the first RS is a periodically transmitted RS, and the second RS is an aperiodically transmitted RS; or, the first RS is a semi-statically transmitted RS, and the second RS is an aperiodically transmitted RS; or, the first RS is a periodically transmitted RS, and the second RS is a semi-statically transmitted RS.

3. A communication device, comprising a processor and a storage storing therein a computer program, wherein the computer program is configured to be executed by the processor to implement the method according to claim 2.

4. A non-transitory computer-readable storage medium, comprising instructions, wherein the instructions are configured to be executed by a computer to enable the computer to implement the method according to claim 2.

5. A communication device, comprising a processor and a storage storing therein a computer program, wherein the computer program is configured to be executed by the processor to implement the method according to claim 1.

6. A non-transitory computer-readable storage medium, comprising instructions, wherein the instructions are configured to be executed by a computer to enable the computer to implement the method according to claim 1.

7. A method of receiving transmit power of a reference signal (RS), comprising:

receiving indication information transmitted by a network device, wherein the indication information carries an actual difference value between power used to transmit a first RS and power used to transmit a second RS, and the actual difference value between the power is a power offset value that is in a power offset set configured by the network device, and is a difference of power used to transmit a second RS from power used to transmit a first RS.

8. The method of receiving the transmit power of the RS according to claim 7, wherein the first RS is a periodically transmitted RS, and the second RS is an aperiodically transmitted RS; or, the first RS is a semi-statically transmitted RS, and the second RS is an aperiodically transmitted RS; or, the first RS is a periodically transmitted RS, and the second RS is a semi-statically transmitted RS.

9. A communication device, comprising a processor and a storage storing therein a computer program, wherein the computer program is configured to be executed by the processor to implement the method according to claim 8.

10. A non-transitory computer-readable storage medium, comprising instructions, wherein the instructions are configured to be executed by a computer to enable the computer to implement the method according to claim 8.

11. The method of receiving the transmit power of the RS according to claim 7, further comprising:

determining, according to the power offset value in the indication information, transmit power used by the network device to transmit a current RS.

12. A communication device, comprising a processor and a storage storing therein a computer program, wherein the computer program is configured to be executed by the processor to implement the method according to claim 11.

13. A non-transitory computer-readable storage medium, comprising instructions, wherein the instructions are configured to be executed by a computer to enable the computer to implement the method according to claim 11.

14. A communication device, comprising a processor and a storage storing therein a computer program, wherein the computer program is configured to be executed by the processor to implement the method according to claim 7.

15. A non-transitory computer-readable storage medium, comprising instructions, wherein the instructions are configured to be executed by a computer to enable the computer to implement the method according to claim 7.

* * * * *